Figures 1, 2:
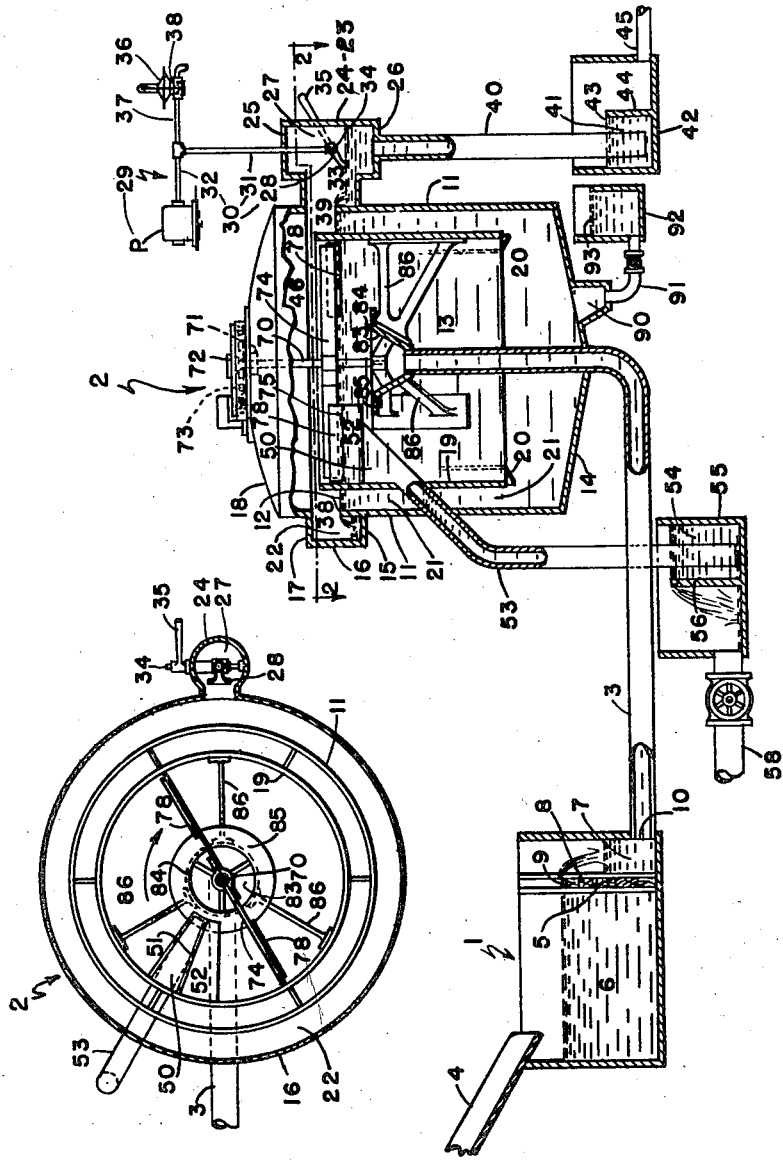

Nov. 5, 1946.    T. B. COUNSELMAN    2,410,633
TREATING RUBBER SUSPENSIONS
Filed Nov. 4, 1943    2 Sheets-Sheet 1

INVENTOR.
THEODORE B. COUNSELMAN,
BY
ATTORNEY

Patented Nov. 5, 1946

2,410,633

UNITED STATES PATENT OFFICE 2,410,633

TREATING RUBBER SUSPENSIONS

Theodore B. Counselman, Evanston, Ill., assignor to The Dorr Company, New York, N. Y., a corporation of Delaware Application November 4, 1943, Serial No. 508,920

11 Claims. (Cl. 260—86.5)

In the manufacture of synthetic or artificial rubber there is produced, for example from butadiene and styrene as basic materials, that which is known as synthetic or artificial latex and which is therefore often referred to as latex because of this having a milky appearance resembling natural latex. In the process of producing synthetic rubber such synthetic latex is co-polymerized whereby there is produced a liquid-solids mixture or suspension, herein referred to as coagulum and which comprises serum or brine as a major liquid component thereof and synthetic rubber solids, crumbs or curds, of varying sizes and herein collectively referred to as synthetic or artificial rubber crumbs or which are more definitely referred to herein as butadiene styrene co-polymers or crumbs. This coagulum therefore comprises that which may be viewed as a liquid fraction of mother liquor on the one hand and a mass of such suspended synthetic rubber crumbs on the other which have occasioned and developed in the mother liquor during a suitable reaction treatment carried out for realizing the sought for synthetic latex. Some of these crumbs are relatively large but there is a certain quantity thereof which is extremely small or fine ranging down to quasi-colloidal or colloidal size particles.

The larger sizes of the crumbs resemble curds of cottage cheese and are of a size up to one-half inch in diameter. When the coagulum in which said crumbs exist is exposed to normal atmospheric pressure and is relatively quiescent, the larger co-polymer crumbs rise to the upper portions of the serum or mother liquor in which they were developed, this because the specific gravity thereof is less than that of the brine or serum of the mother liquor in which they are thus found, but under the indicated state of facts the smaller size particles or synthetic rubber fines or co-polymers do not readily and quickly rise within the serum or mother liquor, neither do they readily and quickly settle within the mother liquor in which they are yielded. In fact, much of said fines rather than tending to either rise or settle within the serum tend to remain as relatively dormant suspensions in the liquid after the manner of colloidal particles suspended in the liquid and which continue to remain in suspension therein.

In fact, the finer synthetic rubber particles or finer co-polymer grains have a decided tendency to continue in suspension, to wit, in a manner according to which they may be referred to as solids more or less in colloidal suspension, or as solids in quasi-colloidal suspension. In other words, while by known methods one may assemble and separate from the coagulum the coarser of the synthetic rubber particles, nevertheless difficulty is experienced when one attempts to recover the synthetic fines of that character whereby they tend to continue in suspension in the serum and resist removal therefrom.

For effecting a method of removing said co-polymer fines, some of which may approach colloidal conditions or which because of the physical form or condition thereof refuse to respond by known process to effective separation from the liquid bearing the same, special treatments are required or are preferably resorted to. In order to overcome this difficulty or apathy respecting these fines and to assure the effective separation thereof from the liquid bearing the same, this invention includes the employment of a process wherein there is realized a flotation of the fines by exposing the surface of a liquid-solids mixture bearing the same, as for example the coagulum, to an overlying gaseous medium maintained at pressures substantially lower than that of the outside atmosphere. Under the influence or effect of the vacuum or sub-atmospheric pressure conditions of the overlying gaseous medium the fines will rise to the surface of the liquid in a manner favorable to their ready removal from the surface of the liquid bearing the same, to wit, as floated material or scum.

In the mother liquor or briny serum, there is often contained soap or fatty matter of a character that tends to adhere to and continue with the yielded solids, as for example, upon the crumbs even after they have been separated from the mother liquor. Another aspect of this invention is the devising of an effective and efficient manner for separating the synthetic rubber from the liquid fraction or serum of the coagulum and it is particularly concerned with the effective separation of synthetic rubber crumbs from a liquid fraction in which they are yielded or in which they are found.

A main feature and aspect of the invention revolves about a process and system for effecting an efficient and ready separation of the synthetically produced rubber solids and particularly of such co-polymer crumbs from their mother liquor.

The invention has in view the obtaining of such synthetically produced solids and particularly such solids as are in the form of crumbs in washed condition, as for example, in condition in which they have been freed (a) of substance such as soap or fatty acids and which tend to adhere thereto or remain therewith, or (b) of some of the process liquor or brine which would otherwise remain in the interstices of or on the surface of the crumbs.

The invention hereof is illustrated and described in connection with the subjecting to a solids-removal treatment of a liquid having suspended therein synthetic rubber solids or crumbs, which suspension or mixture containing said synthetic rubber crumbs has been realized in a process according to which such crumbs are produced from co-polymerization of certain starting material that comprehends butadiene and styrene as basic products therefor.

It will be pointed out that the invention hereof is directed to or revolves about the removing of curds, crumbs, or fines referred to as co-polymers developed or realized in and by a butadiene styrene process from the manufacture of that which is referred to as synthetic rubber and which in many respects is available as a substitute for rubber products produced from the sap or gum obtained from the rubber plants or trees. The invention hereof is applicable for employment in any such process wherein there is realized a liquid-solids mixture embodying such curds, crumbs, or fines synthetically produced by polymerization and which are to be separated from the liquid fraction of the mixture in which they were developed or realized.

In order to separate the resulting polymerized synthetically produced rubber solids from such liquid-solids mixture, there have been proposed or employed devices such as vacuum filters or shaking screening mechanisms. Where a vacuum filter is used the solids are collected as a layer or sheet on the filtering medium. The filtering medium may be a woven wire mesh or screen or a filter cloth, or the equivalent on the peripheral portion of a rotating drum.

The filtrate or effluent leaving the layer or sheet and passing through such medium or screen contains to some extent fines which continue with the filtrate or effluent passing from the left-behind or separated-out rubber crumbs. This filtrate if derived from a coagulum is that liquid fraction which has heretofore been referred to as serum, it may be relatively strong or rich in certain desired chemical content and it will contain some rubber fines which pass therewith from left-behind rubber crumbs. This filtrate or serum which may be undiluted or which may be only a minor dilution may be passed to a preceding portion of the process whereat the serum with the fines therein are made available for re-use or re-treatment in the process.

Where one desires to obtain crumbs which had been washed it is advisable to pass the already separated-out and substantially debrined crumbs derived from the coagulum for a further or washing operation and for a dewatering of the washed solids. Filters, screens or other suitable apparatus may be employed for this purpose and here again the liquid or effluent passing from the filters, screen or other separating medium contains fines washed out from the larger rubber crumbs and which pass with the effluent leaving the crumbs. This wash water effluent contains some of the much diluted brine and some washed out solids and may be identified as an effluent of major dilution. The rubber crumbs or fines removed in this manner may seem in quantity relatively small; however, in the aggregate they constitute a considerable amount—a quantity of such extent that they might ultimately collect as an objectionable mass if the wash water were otherwise passed directly to the waste. They would also constitute a substantial loss in quantity of synthetic rubber if not recovered and an important aspect of this invention revolves about the obtaining, recovering or collecting of the fines passing with the effluent leaving the separated-out larger rubber crumbs.

Another aspect of the invention revolves about the passing of the rubber fines recovered from the effluent liquid either back to a preceding portion of the process or even to a subsequent portion of the process wherein they are made available for increasing the efficiency of the rubber yield of the plant.

It has been ascertained that when a body of liquid containing synthetic rubber curds suspended therein is placed under vacuum there is realized a prompt rising of the curds, not only a prompter rising of the larger size crumbs but also a prompt rising of the rubber fines to the surface of the liquid whereat they can be collected as floating material or scum which when handled in the proper manner can be removed from the liquid along one path while clarified effluent freed of suspended rubber solids can be passed along another.

The steps just referred to are best carried out (a) by establishing and maintaining a body of liquid within a confining tank so that the surface of the liquid is constantly exposed to subatmospheric pressure conditions of overlying air or gas; (b) by continually feeding to such established body a liquid-rubber mixture containing synthetic rubber curds in suspension therein; (c) by continually collecting and removing as float material from the surface of said body the rubber solids rising to the surface thereof and delivering the collected solids from the tank or container along one path at the same time avoiding entrance of outside air into the tank; (d) by passing clarified liquid from a lower portion of the body, namely, liquid freed of the rubber solids and which is delivered along a pathway leading from the tank while at the same time avoiding entrance of air into the tank; and (e) by removing, according to operative requirements, air or gaseous medium tending to collect within the tank above the body whereby proper sub-atmospheric conditions at the surface of the body will be constantly maintained.

There are diagrammatically illustrated in the accompanying drawings systems for removing synthetic rubber solids from a liquid-solids mixture containing the same.

In one of said systems there is employed a vacuum type of apparatus for separating rubber crumbs of varying sizes from a coagulum or other liquid suspension of synthetic-rubber solids.

In another of said systems, the large rubber solids are first separated from the liquor of the process, which is recovered as non-diluted process liquor or as process liquor only slightly diluted, to wit, as brine or serum herein identified as a serum containing effluent of minor dilution. Afterwards these initially separated larger rubber solids are washed and separated from the wash water, the latter of which may be identified as a serum containing effluent of major dilution.

The serum containing effluent of minor dilution may be passed along one path leading to a prior portion of the process, or it may be conducted along another path leading to a vacuum type of separation apparatus. This serum effluent of minor dilution carries rubber solids therewith as suspended matter and the treatment in this vacuum separator is to recover the finer solids as floated material passable from the apparatus along the one path while leaving behind a clarified serum or brine which can be passed as effluent from the apparatus along another path as for reuse or employment in the process as may be deemed advisable.

The washing operation dilutes brine in the interstices of and remaining on the surface of the relatively de-brined mass of solids of the initial separation process, and the wash water effluent from this mass has therein a quantity of brine or serum and also as suspensions therein a certain quantity of finer synthetic rubber solids. The wash water or serum containing effluent of major dilution is conducted to a vacuum type of separation apparatus which particularly functions to accomplish a floating of the suspended polymerized synthetic rubber solids that are collectable and removable from the apparatus along one path while leaving behind a weak but relatively clarified effluent which may be passed along another path for such use or disposition thereof as may be deemed advisable.

The fines recovered both from the serum containing effluent of minor dilution and from the serum containing effluent of major dilution can be passed either to a preceding portion of the process or to a subsequent portion of the rubber producing process as may be deemed advisable having in view the particular requirements of the particular synthetic rubber producing process employed.

The fundamental features of the apparatus for performing the separation of the synthetic rubber solids—either large or fine solids—from the liquid in which they are suspended are diagrammatically illustrated in each of the systems referred to and constitute an important instrumentality thereof. For convenience said apparatus may be referred to as a vacuum type of crumb separating apparatus.

The vacuum type of crumb separation apparatus has been adopted for the separating from a liquid-solids mixture bearing the same of synthetic rubber fines because the latter are not readily settleable from the liquid because the colloidal characteristics thereof tend to cause said fines to continue as colloidal or quasi-colloidal suspensions.

The same process and apparatus which is well adapted for removing of the difficultly settleable fines from a liquid is effective for removing the larger size of rubber crumbs and therefore it becomes logical to employ this apparatus not only for removing the fines, but also at the same time for removing the coarser solids, and in this manner avoid the necessity of employing separate and quite dissimilar types of machines for the separating-out operation.

In said drawings which constitute a part of this specification:

Figure 1 diagrammatically illustrates a vacuum type of separation unit functionable in a synthetic rubber plant for separating synthetic rubber crumbs from a process liquid fraction, or brine and according to which unit the separated-out synthetic rubber crumbs are deliverable along one path while the liquid fraction is deliverable along another path.

Fig. 2 is a horizontal sectional view taken on the plane indicated by the broken line 2—2 of Fig. 1 and looking in the direction of the arrows.

Figure 3:
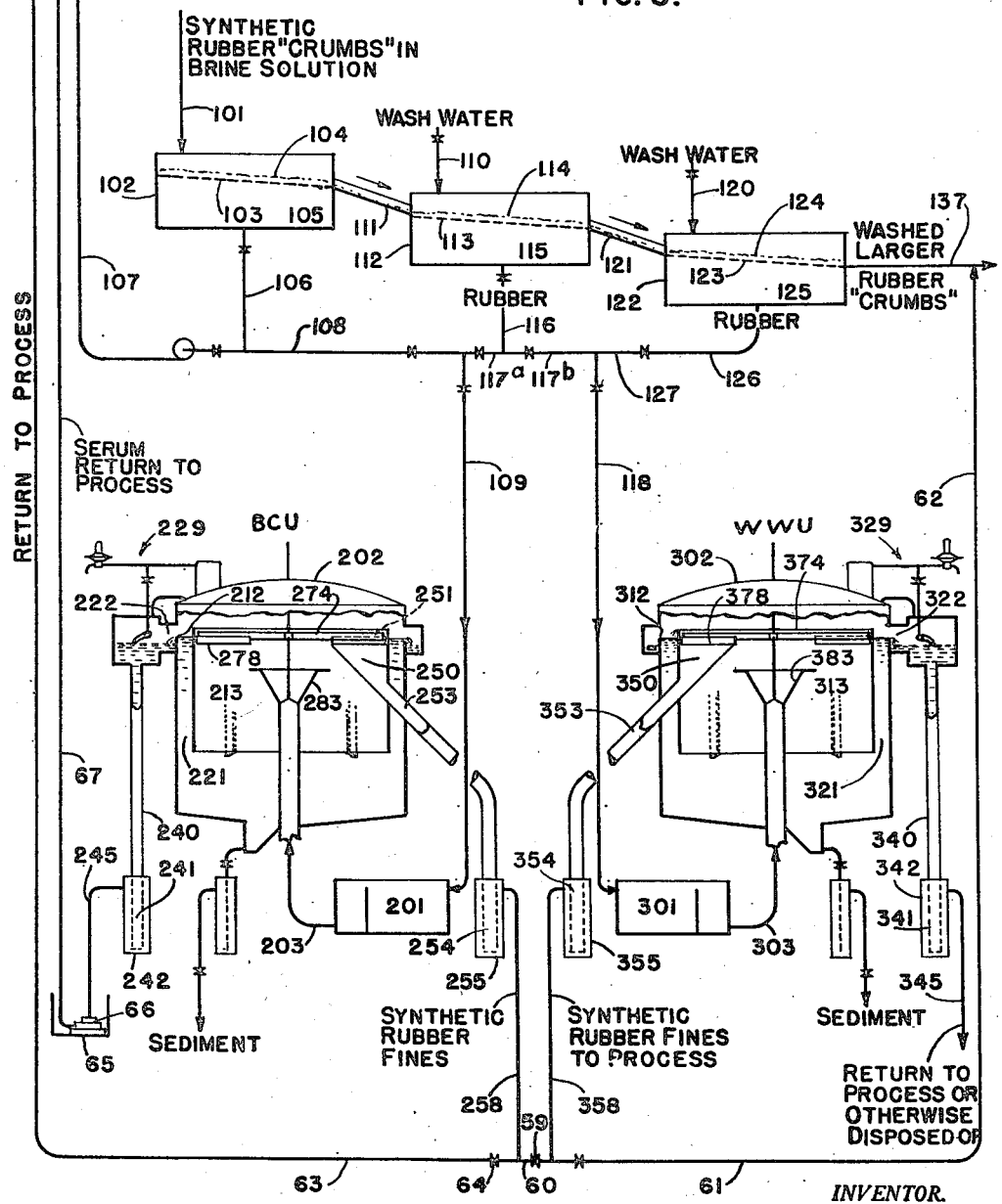

Fig. 3 diagrammatically illustrates such a unit in one type of environment.

Reference is now made to the drawings in detail. Therefrom in connection with the description herein set forth, there will be readily appreciated and understood the importance and advantageous employment of certain steps or operations realizable in and by the vacuum type of apparatus referred to in and for the separation of synthetic rubber crumbs from a liquid fraction bearing the same and particularly of the smaller fines thereof from a liquid fraction bearing the same in suspension.

In these figures of the drawings there is illustrated a unit adaptable for employment in a synthetic rubber producing plant, namely, a unit embodying a feed-receiving basin 1 adapted to hold a body of coagulum and a closed top vacuum tank 2 with associated parts. This vacuum tank 2 has a draft tube or feed pipe 3 with a low intake section leading from the receiving basin 1 and an upper delivery section terminating within the tank at elevation substantially above that of the bottom of the tank but lower than that of the upper interior portion of the tank.

In this tank there is held and maintained a continuously changing body of liquid undergoing treatment, the surface level of which is normally maintained up to an elevation substantially above that in the bottom of the tank but somewhat lower than that of the upper interior portion of the tank and there is also maintained within the upper interior portion of the tank, air or other gaseous medium directly overlying said ever changing body of liquid and to which the surface of the ever changing body of liquid is constantly exposed. The tank has means as will hereinafter appear for sucking the air or gaseous medium from the interior of the tank whereby the air or gaseous medium in the tank will be maintained under vacuum as it is sometimes referred to, or as otherwise expressed, whereby the air or gaseous medium will be maintained at pressures substantially below that of the air outside of the tank. The sub-atmospheric pressure of this gaseous medium is such as will be indicated by not less than substantially 9 inches of mercury.

I have ascertained that a vacuum or sub-atmospheric pressure type of flotation operation can be advantageously employed to effect quick rising and ready removal of the synthetic rubber fines from a coagulum or liquid fraction bearing the same and I have adopted as a practical form of apparatus for accomplishing this quick and ready removal of the small fines a type of apparatus possessing the fundamental features of operation embodied in and by the vacuum type of apparatus illustrated in and by Figs. 1 and 2.

In the unit or apparatus of Figs. 1 and 2 gas-bearing mother liquid having polymerized synthetic rubber crumbs which were yielded therein is fed as a liquid suspension of polymerized synthetic rubber solids which is delivered to the basin 1 through a supply tube or conduit 4. The basin has an overflow partition 5 rising from the bottom thereof whereby the interior of the basin is divided into a relatively large receiving and storing section 6 and a small section 7 for receiving overflowed liquid and solids at the flow delivery side of the partition.

This partition is made up of removable and replaceable boards 8 and collectively constitutes a structure providing an adjustable height dam the upper edge 9 of which constitutes an overflow weir at the top of the partition. The adjustment of the height of this dam is according to the quantity of the liquid-solids mixture to be retained in the large section of the basin but it can be employed to release into the smaller section a controlled outflow of liquid-solids mixture to be treated. The unit is designed so that there is constantly contained in the smaller section 7 sufficient of the overflowed liquid-solids mixture to insure the maintaining of the intake end 10 of the draft tube 3 in submergence.

The crumb separating tank as shown, embodies an upright marginal wall 11, cylindrical in plan, the upper horizontally-extending edge 12 of which provides that which may be called a clarified-liquid overflow weir edge that determines the normal operative level of the ever changing body of liquid which is normally maintained within the tank. This ever changing body of liquid is designated as 13. The tank has a bottom member or floor portion 14 sloping downwardly and inwardly from the lower edge portion of the marginal wall. The tank also has a launder structure providing an enclosed launder for receiving liquid overflowed from the upper edge 12. The launder structure embodies a lower annular member 15 extending outwardly from the marginal wall, to wit, from an elevation thereof slightly lower than that of the upper or overflow weir edge 12. The launder structure also embodies a rising outer wall portion 16 extending upwardly from the outer edge of the member 15 and an upper annular member or section 17 at elevation higher than that of the overflow weir edge 12 and extending inwardly from the rising outer wall portion 16.

The upper portion of the tank is completed by a top member or cap portion 18 rising from the inner edge portion of the upper annular member 17. This top or cap member 18 is relied upon to complete with the launder structure a relatively gas-tight upper portion for the tank. Within the interior of the tank there is provided a cylindrical baffle member 19 that is circular in plan and which extends upwardly from a lower interior portion of the tank, namely, from an elevation lower than that of the overflow weir edge 12 to an elevation higher than that of the overflow weir edge 12. This baffle member 19 is carried from the cylindrical marginal wall 11 through the medium of spacing and supporting brackets 20. The cylindrical baffle 19 and the marginal wall 11 function to provide between them an upflow conduit 21 leading from a lower interior portion of the tank towards the overflow weir edge 12.

This upflow conduit 21 is annular in plan and affords means whereby there can be realized a relatively uniform upflow of clarified liquid from the lower interior portion of the tank towards and over the weir edge 12. The region within this baffle member 19 occupies a relatively large portion of the horizontal cross-sectional area of the tank and also a substantial portion of the depth of the liquid-holding portion of the tank. There is provided therein that which may be referred to as a zone wherein incoming liquid synthetic rubber-solids mixture is received for treatment and wherein the ever changing liquid body 13 is held during the vacuum treatment thereof within the tank.

The enclosed launder provided by the upper portion of the marginal wall 11, the lower annular ring 15, the rising outer wall portion 16 and the upper annular ring 17 is designated as 22 and is referred to as a clarified liquid-receiving launder because of its receiving the liquid overflowing thereinto from the weir edge 12.

In the construction shown there is an auxiliary confining structure 23 which may be viewed as part of the launder and which embodies a wall member or portion 24, a cap member or top portion 25 and a lower member or bottom portion 26 for providing therein a control chamber 27. In this chamber there is disposed an adjustable suction nozzle means 28 constituting an intake end of a pumping means 29 provided for withdrawing gas or air from the upper interior portion of the tank.

This pumping means 29 embodies an air suction pump P having a suction pipe line 30 leading thereto from the interior portion of the height control chamber 27. This suction pipe line 30 includes the adjustable nozzle means 28 at and for the intake end thereof, a rising tubular section 31 leading upwardly from the nozzle means 28 and an upper horizontal tubular section 32 leading from the rising section 31 and connected to the pump P at the suction side thereof.

The nozzle means 28 is pivotally mounted so that it can be adjusted whereby the intake tip portion 33 thereof can be positioned as to the height or elevation. This adjustment is attained through the medium of a shaft 34 connected to and extending laterally from the nozzle means and providing a horizontally extending supporting axis therefor and a handle 35 which is disposed outside of the structure providing the height control chamber.

The pumping means 29 is also preferably equipped with a vacuum controlling means 36 that is connected to the suction pipe line 30 by a pipe connection 37. The vacuum controlled means 36 is provided with an outwardly spring pressed relief valve 38 which yields to allow an outflow of outside air into the suction line only after liquid has been sucked into and upwardly within the rising section and for a substantial portion thereof but which valve opens before the liquid within the rising pipe section 31 reaches the upper horizontal section 32. In this way there is assured continuation of conditions whereby the pump P will never have to receive and deliver water and whereby the pump can continue to operate to receive and deliver only air or other gaseous medium supplied thereto through the horizontal top section 32 of the suction line 30.

When the reduced pressure conditions within the top portion of the tank change whereby the liquid within the rising section can drop or fall from the rising section 31 and from the nozzle means 28 thereof, the pumping means can then function to withdraw some of the gaseous medium from within the upper interior portion of the tank whereby to continue and maintain the required sub-atmospheric pressure conditions therein for satisfactory operation of the apparatus or unit.

As previously indicated the normal operative surface level of the liquid undergoing treatment in the tank 2 is determined by the elevation of the overflow weir 12 and above this body of liquid there is constantly maintained in zone 46 the heretofore mentioned overlying body of air or other gaseous medium which is continued at pressures substantially sub-atmospheric because of the operation of the pumping means 29. The general structure of the tank and associated parts are such that during the normal operation and functioning thereof there is avoided any short-circuiting entrance of air into the tank from the exterior thereof either through the feeding means leading to the tank or through the means by which clarified liquid is released and passed from the tank, or through the means by which floated and collected rubber crumbs are passed from the tank as scum.

From that which has preceded and also from an inspection of Figs. 1 and 2 it will be manifest that the gaseous medium which is within the upper portion of the tank occupies the entire region therein which is at elevation higher than that of the overflow weir edge 12. It will also be noted that this sub-atmospheric pressure gaseous medium extends across not only the full upper portion of the tank within the area defined by the overflow weir edge 12 but also so as to overlie all of the liquid within the overflowed liquid receiving launder, including the liquid within the control chamber 26 of the latter. In other words passage area for the gaseous medium is provided at 38 and 39 between the uppermost interior portion of the top or cap portion of the tank on the one hand and the upper interior portions of the launder structure, including the upper portion of the control chamber 26 thereof on the other hand.

Referring now to the clarified liquid release means. This includes the structure providing the annular upflow conduit 21 leading from a lower interior portion of the vacuum tank, the overflow weir 12, the structure providing the enclosed overflow receiving launder 22 and the control chamber 26 thereof, a clarified-liquid receiving and release box 42, a pipe or tubular member 40 extending downwardly from the lower portion of the control chamber 26 into a body of sealing liquid 41 maintained within the receiving box 42 up to an elevation 43 determined by an overflow weir or dam 44 within the box 42. This box 42 is also sometimes referred to as a clarified-liquid release box. The clarified liquid which is released from the tank passes downwardly from the overflow launder 22 through this pipe 40 into the body of liquid 41 whereby the sealing liquid is continued and from which any excess accumulations of clarified-liquid overflow the upper edge of the dam 44 and are passed from the release box 42 as through the pipe 45.

As to the means for receiving collected floating rubber crumbs and for passing the scum of collected rubber crumbs from the interior to the exterior of the vacuum tank this comprises an open top trough or float-receiving hopper 50 provided within the tank, a receiving box 55 and a pipe or tubular section 53 extending downwardly from the trough thence outwardly through the tank structure and into a body of sealing liquid 54 maintained within the receiving box 55 up to an elevation determined by an overflow weir or dam 56 within the box 55. Any floating material passing downwardly from the trough through the leg 53 is received in this liquid-holding section of the box 55. As it accumulates it overflows the weir 56 and can be released from the box 55 through the valve-controlled pipe 58. As to the open top trough or float-receiving hopper 50 this has an overpass edge 51 with ramp 52 leading upwardly thereto. This overpass edge 51 is at elevation preferably slightly higher than that of the overflow weir edge 12 and the trough is disposed so as to receive floating material passed or passing thereto as it rises to and collects at the upper surface of the body of liquid within the tank.

In order to insure a positive transfer of the floating rubber crumbs to and into the float-receiving trough 50 there is provided float-sweeping means comprising a vertical shaft 70 extending from the exterior of the tank through a sealing packing 71 at the top of the tank. This shaft is supported from suitable bearing means 72 provided at the top of the tank. A motor actuated means 73 is also provided for turning the shaft. The shaft carries outwardly extending arms 74 having resilient sweeping members 78 extending downwardly therefrom and dipping into the liquid body within the confines of the cylindrical baffle 19. As this shaft turns about its vertically extending axis the arms with resilient sweeping members depending therefrom serve to engage and impel the floating rubber crumbs up the ramp past the overpass transfer edge into the receiving hopper or trough 50 from which they pass from the downwardly extending tubular member 53.

In connection with the foregoing, it will be noted that the depending or tubular members 40 and 53 in effect constitute depending barometric legs the lower ends of which constantly dip into sealing liquid and by which the particular clarified liquid is conveyed or the collected rubber crumbs are conveyed and delivered to the exterior of the vacuum tank and in a manner whereby there is minimized or avoided entrance of outside air into the interior of the tank incident to such transfer.

As to the draft tube, in the construction shown the draft tube 3 is provided at the upper terminal portion thereof with a flaring portion 83 the upper edge 84 of which is disposed at elevation proximate but somewhat lower than that of the overflow weir edge 12. There also extends outwardly from the upper edge 84 an annular plate 85, spaced radial brackets 86 carried by and extending inwardly from the cylindrical baffle member affording support for the annular plate 85 and through the medium of the latter for the flaring portion at the rising terminal of the draft tube 3.

A sump 90 is provided in the bottom of the tank for receiving any sedimented material that may pass or be passed thereto. A valve controlled pipe 91 leads from this sump and terminates in a box 92 when a body of sealing liquid 93 can be maintained. This valve controlled pipe can be employed to discharge sediment or liquid from the bottom of the tank while at the same time the sealing liquid 93 can be relied upon to minimize or avoid entrance or backflow of outside air into the tank.

The system of Fig. 3 has in view the receiving and treating of coagulum, that is, a serum with rubber crumbs mixture suspended therein, such as has been obtained from a co-polymerization of synthetic latex derived in the performing of a synthetic rubber producing process.

According to this system, the coagulum which is sometimes described as a liquid-solids mixture, of which the liquid fraction is brine while the solids are rubber crumbs of varying sizes in the brine solution or serum, is supplied along a pathway 101 into a de-brining tank or initial liquid-solids separating instrumentality 102 having a screening or filtering medium 103 on which the rubber crumbs lodge as a layer or mass 104 and from which the brine leaves as a serum containing effluent of minor dilution collecting within the lower portion 105 of the tank 102. This effluent brine carries therewith a certain amount of the finer rubber crumbs, herein referred to as fines which continue as solids suspension therein. The effluent bearing the fines therein passes from the tank 102 into and along a pathway or valve controlled pipe line 106.

The rubber crumbs of the initially separated layer or mass 104 are sometimes referred to as debrined crumbs but it will be noted that a certain quantity of brine continues in the layer or mass 104. The crumbs constituting this mass are conducted or conveyed as along chute or conduit 111 into an initial washing tank or instrumentality 112 having a screening or filtering medium 113 on which the rubber crumbs lodge and are supported as a mass or layer 114 while being supplied and washed with water delivered thereto along the pathway or valve-controlled water supply line 110. The wash water thus applied washes out the remaining brine and also carries therewith certain of the finer grains from the layer 114 and the water leaving the layer collects as wash water effluent in the lower portion 115 of the tank 112. This wash water effluent bearing some brine and also quantities of the washed out synthetic rubber fines suspended therein, which is sometimes referred to as a serum bearing effluent of major dilution, is pased from the washing tank 112 into and along a pathway or valve-controlled pipe line 116.

From the washing tank 112 the crumbs of the washed mass 114 are conducted or conveyed as along a chute or conduit 121 into a second or subsequent washing tank or instrumentality 122 having a screen filtering medium 123 on which the thus transferred crumbs lodge or are supported as a mass or layer 124 while being supplied and washed with water delivered thereto from a valve-controlled line 120. The effluent of this subsequent washing operation also carries a certain quantity of further washed out fines which continue with it. The secondary wash water effluent is passed from the lower portion 125 of the secondary washing tank 122 along the pathway or pipe line 126.

The de-brined and the twice washed and dewatered rubber crumbs constituting the coarser or larger synthetic rubber crumbs derived from the coagulum are conveyed from the last washing tank 122 along the pathway 137 for such further processing as may be desired and in order.

It is feasible to pass the brine effluent of the first tank 102 from the brine effluent line 106 leading therefrom by pumping the brine through the valve-controlled pipe line 107 to a preceding portion of the process or by passing the brine from the line 106 into a valve-controlled branch line 108 connected to a feed or pipe line 109 leading to and delivering into a brine receiving basin 201 constituting a feed-receiving basin for a vacuum type of crumb separation apparatus identified as BCU, namely a vacuum type of crumb separation apparatus embodying the features of construction and functioning to separate synthetic rubber fines from the brine or liquid fraction bearing the same according to construction and method of operation already described in connection with the synthetic crumb separation apparatus or unit of Figs. 1 and 2.

As to the wash water effluent from pipe line 116, this can be optionally passed at will by a valve-controlled branch 117ª to the feed line or pipe 109 leading to the aforementioned receiving basin 201 or by a valve-controlled branch 117ᵇ to a feed line or pipe 118 leading to a receiving basin 301 of a second crumb separating unit identified as WWU and which like BCU embodies the features of construction and function to separate synthetic rubber fines from a liquid fraction bearing the same according to the disclosure respecting the apparatus or unit of Figs. 1 and 2.

As to the wash water effluent from pipe line 126, this can be passed by a valve-controlled connection 127 to the pipe line 118 leading to the receiving basin 301.

For convenience the vacuum type of crumb separation apparatus or unit that embodies the brine receiving basin 201 has been herein identified as brine crumb separation unit BCU, while the apparatus or unit embodying the basin 301 has been herein identified as the wash water crumb separating unit WWU.

In Fig. 3 the parts of the brine crumb separation unit BCU which correspond to like parts in unit of Fig. 1 bear reference characters which are 200 greater than that of the corresponding reference characters of Fig. 1. Likewise with respect to the parts of the wash water crumb separation unit WWU they bear reference characters which are 300 greater than of the reference characters of unit of Fig. 1. As the units BCU and WWU and the functioning parts thereof correspond to and function according to the disclosure respecting the corresponding parts of the apparatus or unit of Fig. 1 extended comments in regard to the construction and operation of the apparatus or units BCU and WWU are unnecessary at this time.

In connection with the operation of the brine crumb separation unit BCU, it will be noted that the brine effluent bearing fines supplied to the feed-receiving basin 201 passes from the latter through the draft tube 203, and is delivered from the flaring top 283 of the latter into the ever changing body of liquid 213 within the closed top vacuum tank 202. The fines rise and are collected by the resilient member 278 at the outer ends of the horizontal turning arms 274 whereby they are swept towards and beyond the over-pass edge 251 of the receiving hopper 250. From this hopper the fines are delivered through the tubular section or barometric leg 253 into the sealing liquid 254 within the receiving box 255 from which the accumulated portion thereof is released as overflow through the pipe 256. The clarified liquid, to wit, the serum freed of fines, leaves from a lower portion of the tank 202, to wit, through the upflow conduit 221 which is annular in plan, overflows the weir edge 212 and enters the enclosed launder 222 and flows therefrom downwardly into and through the barometric leg by the tubular member 240 which constantly dips into sealing liquid 241 in the receiving box 242 and from which the accumulating brine or serum is released as overflow through the pipe 245. Suitable vacuum conditions are maintained in this unit through the medium of the pumping mechanism collectively indicated as 229.

In like manner the wash water effluent bearing fines which has been delivered through pipe line 118 into the feed-receiving basin 301 is passed from the latter through the draft tube 303 into the ever changing body of liquid maintained in the closed top vacuum tank 302 wherein a liquid-solids separation takes place whereby the fines float. These floating fines are passed into the open top trough or hopper 350 from which they pass downwardly and into the barometric leg 353 into the fines-receiving tank or box 355 from which they pass as overflowed discharge through the pipe 356 while the clarified liquid or wash water freed of fines passes upwardly from a lower portion of the tank through the annular upflow conduit portion 321 past the overflow edge 312 into the enclosed launder and whereby clarified wash water effluent ultimately passes into and downwardly through the barometric leg 340 into the receiving basin or release box 341 from which there is a release of clarified liquid to discharge along the line 345.

If the synthetic rubber fines thus recovered from the crumb separation units are to be incorporated with the already washed out larger crumbs in the pathway 137, this can be accomplished by passing the recovered fines along a pathway or pipe line that comprises the pipe line sections 60, 61 and 62 leading to 137. If a valve 59 is closed, then it is feasible to pass the fines from the wash water crumb separating unit WWU to the pathway 137 while the crumbs from the brine crumb separation unit BCU can be passed as along the pathway or pipe line 63, assuming the valve at 64 is open to a preceding portion of the process.

Respecting the serum or brine which is separated out by the brine crumb separation unit BCU this can be taken care of first as by passing the brine from box 242 through pipe 245 into a box or basin 65 from which the brine can be passed as by pump 66 and pipe line 67 to any preceding portion of the process where the brine can be used.

From that which has preceded, it will be manifest that the crumb separation apparatus which is described in connection with the unit or apparatus of Figs. 1 and 2 can be employed to separate out the rubber crumbs of varying sizes from the liquid fraction in which they are found while according to the system of Fig. 3 one can remove the larger crumbs as by screening or filtering and can remove finer crumbs from brine bearing the same and can also remove finer crumbs from wash water effluent bearing the same.

Whereas the foregoing describes the treatment of synthetic rubber suspensions to recover the rubber particles, this invention is equally applicable to reclaim natural rubber solids that are in suspension phase as a result of practicing processes for the recovery or reclaiming of such rubber. This is especially true where rubber fines are difficult to separate from suspension and would otherwise be lost by passing into the sewage with the waste water—where such rubber fines are detrimental to subsequent sewage treatment processs.

It will be manifest that according to the disclosure hereof one can readily adopt the method hereof to any part of a synthetic rubber producing process wherein it is desired to remove rubber crumbs from a liquid wherein the same was yielded or exists. The invention can be particularly employed where one desires to eliminate or collect from the liquid bearing the same synthetic rubber fines which may be in colloidal or quasi-colloidal condition.

I claim:

1. In a butadiene styrene co-polymer process for the manufacture of artificial rubber and the recovering of fine co-polymer particles from the briny suspensions thereof wherein there are gases liberatable from such suspensions when the latter are exposed to subsequent sub-atmospheric pressure conditions; the method comprising establishing an ever-changing body provided by such suspension and maintaining the surface level thereof up to an operative elevation; exposing a surface portion of such body to a gaseous medium liberated from, directly overlying and engaging the surface portion of such ever-changing body; maintaining such medium at pressures substantially sub-atmospheric by applying suction thereto; continually feeding such suspension from a locality outside of said ever-changing body and delivering the same to the body proximate the surface thereof and whereat the thus-delivered suspension comes under the direct influence of the overlying gaseous medium thereby furthering a liberating of certain quantities of said gases and furthering the floating of fine polymer suspended particles to said exposed surface portion of said body; continually collecting floating polymer particles and removing them from said body from the region whereat they are exposed to said overlying gaseous medium to a locality outside of said region; and continually removing liquid fraction from a lower portion of said ever-changing body to a locality outside of said body.

2. In a butadiene styrene co-polymer process for the manufacture of artificial rubber wherein there is involved the obtaining of co-polymer crumbs from gas-bearing and gas-releasing briny suspensions provided by a coagulum comprising such crumbs as a solids fraction thereof and serum as a liquid fraction thereof and bearing therein gases liberatable from the suspension when the surface of the suspension is exposed to overlying gaseous medium whose pressure is less than that which the suspension was previously subjected to, the method comprising establishing an ever-changing body of said suspension and maintaining the surface thereof directly exposed to a gaseous medium liberated from and overlying the ever-changing body, continually supplying suction to the gaseous medium overlying said ever-changing body to maintain pressure thereof substantially below that to which the suspension was previously exposed and all of this while the following operations are carried out, namely, while continually supplying quantities of said coagulum and delivering it as feed proximate and towards the surface level of the body, while removing co-polymer crumbs floating at the surface of said body and delivering the removed crumbs to a region outside of said body, and while passing liquid relatively free of said crumbs from a lower region of said body to a locality outside of the same.

3. In a butadiene styrene process for the production of basic crude products usable in or for the production of synthetic rubber and in which process there is the obtaining of co-polymer crumbs from a briny serum-crumb mixture realized in the process, wherein the co-polymer crumbs are of varying sizes ranging from coarse particles to and including small particles suspended in the liquid fraction provided by serum and wherein there are in the serum gases which are liberatable when the serum-crumb mixture is subsequently exposed to an overlying gaseous medium of pressure less than that to which the serum mixture is exposed; a continuous method including establishing and maintaining an ever-changing body of liquid provided by such serum-crumb mixture, constantly exposing the surface of said ever-changing body to an overlying confining body of gaseous medium liberated from said serum-crumb mixture, applying suction to said confined gaseous medium to maintain pressures thereupon substantially less than that of the serum-crumb mixture supplied thereto, constantly supplying serum-crumb mixture from a region outside of the ever-changing body and delivering the serum-crumb mixture thus supplied into said ever-changing body within the reach of the suction influence of said overlying gaseous medium, removing floating crumbs from the surface of said ever-changing body and delivering the removed crumbs outside of said ever-changing body and also outside of said gaseous medium while at the same time substantially avoiding entrance of air into said overlying gaseous medium, and passing clarified serum from a lower portion of said ever-changing body to a region outside of the same while at the same time substantially avoiding entrance of outside air into said overlying gaseous medium.

4. In the production and obtaining of butadiene styrene co-polymer crumbs from a briny coagulum containing such crumbs as a suspended solid fraction thereof and process liquid as a liquid fraction thereof, the method comprising establishing and confining the ever-changing body of said process liquor and maintaining the surface thereof up to an operative level, exposing the upper surface portion of said body to an overlying gaseous medium derived from said briny coagulum and applying suction thereto whereby to maintain the same at pressures substantially sub-atmospheric, passing said agitated suspension into and delivering it within said confined body at elevation proximate that of the operative surface level of the body whereby the coagulum thus delivered within said ever-changing body is under the direct influence of said overlying sub-atmospheric pressure gaseous medium, collecting such crumbs assembling as float material at the surface of said body, transferring along one path said collected floating material from within the overlying gaseous medium and transferring the same to a locality outside of said gaseous medium while avoiding any substantial leakage of outside air into said atmospheric pressure gaseous medium incident to said transfer, passing process liquid from along another path from a lower region of said body while avoiding any substantial leakage of outside air into said body incident to said passing of liquid therefrom, and passing the collected transferred crumbs for further treatment.

5. A method according to claim 4, wherein the overlying gaseous medium is maintained at sub-atmospheric pressures substantially not higher than that realized by a suction pull required to lift a confined column of mercury whereby the surface level of the column is not less than 7 inches above that of the surface level of body of mercury exposed to the atmosphere and from which the elevated column was lifted, agitating such briny coagulum to be treated while exposed to atmospheric pressure air.

6. In the production of synthetic rubber according to a butadiene styrene process in which co-polymers in the form of solids of varying sizes are produced and developed under conditions wherein they are existent in the liquid-solids mixture of which the liquid fraction comprises process liquor that includes brine and of which the solids fraction includes said solids, the method comprising initially separating from such mixture large solids removable along a solids discharge pathway, collecting process liquor from said initially separated operation as a primary brine-bearing effluent of minor dilution and conducting the same along a liquid flow-path leading from said initially separated solids, supplying wash water to the initially separated solids, collecting the wash water with fine co-polymer solids as suspensions therein thereby obtaining a secondary brine-bearing effluent of major dilution and insuring the existence in said secondary effluent of gases when the secondary effluent is subsequently exposed to pressures less than that at which the washing operation was carried out, establishing and maintaining an ever-changing liquid body, exposing an upper portion of said liquid body directly to the suction effect of a gaseous medium overlying the same, sucking gases from said overlying gaseous medium for maintaining the pressure thereof lower than that existing when said secondary effluent was obtained, passing quantities of said secondary effluent as feed material into said body and delivering the same at elevation proximate that of the surface of said body, collecting fine solids which assemble as floating material on the surface of said liquid body and within the region overlain by said gaseous medium, transferring collected floated material as recovered fine solids to a locality outside of said region, which transfer of fine solids is in a manner for avoiding any substantial leakage of air into said overlying gaseous medium, passing clarified liquid from a lower portion of said body whereat the suction effect of the overlying gaseous medium is substantially less than that at the overlain surface of said body, delivering the thus passed clarified liquid to a locality outside of said body and in a manner for avoiding any substantial leakage of air into said body, and passing the recovered fine solids to a portion of the synthetic rubber producing process.

7. In the production of synthetic rubber according to a butadiene styrene process in which there is realized a liquid-solids mixture comprising process liquor that includes brine and co-polymers as solids of varying sizes, the method comprising separating large solids from the process liquor; passing separated large solids along one path, passing along another path process liquor bearing fine solids and from which the large solids have been separated; washing the separated large solids while exposing to atmospheric pressure whereby to further remove entrained portions of liquor; passing along a third path the wash water effluent bearing some of the washed out process liquor and also carrying as suspensions therein washed out fine solids derived from the separated large solids; insuring the existence in said wash water effluent of gases employable in the performing of the method, which are releasable and which rise to an overlying gaseous medium of such gases at sub-atmospheric pressures when a body of such wash water effluent is directly exposed to such sub-atmospheric pressure gaseous medium; establishing an ever-changing liquid body; exposing an upper surface portion of said liquid body to a gaseous medium of such gases liberated from liquid supplied for providing such body and directly overlying such body; feeding such wash water effluent with such gases therein and delivering such fed effluent proximate the upper surface of said liquid body; sucking gases from said overlying gaseous medium for maintaining pressures thereof substantially sub-atmospheric whereby to effect the liberating of quantities of gases in the wash water effluent thus fed and delivered whereby to further the floating to the surface portion of said liquid body fine solids suspended in the wash water effluent fed and delivered proximate the surface of the liquid body; collecting fine solids floating within the region overlain by the sub-atmospheric pressure gaseous medium; removing the thus collected fine solids and delivering the same to a locality whereat they are discharged outside of the region whereat they were collected; and passing clarified liquid from a lower portion of the ever-changing body and delivering said transferred liquid to a locality outside of said body.

8. In the production of synthetic rubber according to claim 7, the aerating of wash water effluent before feeding it to the ever-changing body.

9. In the production of synthetic rubber according to claim 7, the passing of the collected and removed fine solids to a portion of the butadiene styrene process for employment therein.

10. In the treating of a briny suspension bearing, as solids therein, butadiene styrene co-polymers and also bearing gas releasable when exposed to an overlying gaseous medium derived from said suspension when at lesser pressures than that at which suspensions were previously subjected, the method comprising exposing a body of such suspension to an overlying gaseous medium obtained as gaseous medium released under said lesser pressures and maintaining such lesser pressures to effect releasing of quantities of gases rising within said body and thereby furthering the flotation of solids of such suspension to the surface of said body and of which rising gases some pass directly into the overlying gaseous medium, collecting from the surface of said body and within the region overlain by said gaseous medium solids floating upon said body and removing the thus collected solids from a region where collected to a locality of the region overlain by said gaseous medium while maintaining the required lesser pressure conditions for said overlying gaseous medium, and passing from a lower portion of said body of liquid substantially freed of said solids and delivering it as a clarified liquid fraction to a locality outside of said body while at the same time maintaining the required lesser pressure conditions for said gaseous medium overlying the body.

11. In the art of producing synthetic rubber according to a butadiene styrene process in which there is obtained a liquid-solids mixture comprising as a solids fraction butadiene styrene co-polymers and has a liquid fraction process liquor that includes brine and releasable gases, the separating of such solids from said liquid fraction by a method comprising establishing from such liquid-solids mixture an ever-changing liquid body having a surface portion overlain and directly exposed to a gaseous medium provided by gases released from such process liquor, sucking gases from the overlying gaseous medium whereby to maintain the same at pressures substantially sub-atmospheric, maintaining the surface of said body up to an elevation providing an operative surface level, passing such liquid solids mixture as feed into said ever-changing body and delivering it at elevation approximately that of the operative surface level of said body whereby the liquid solids mixture as thus delivered comes under the effective influence of said overlying gaseous medium, collecting at the surface of said body and within the region overlain by said gaseous medium co-polymer solids assembled as floating material within said region, removing the thus collected solids from said region and discharging them to a locality outside of said region while at the same time substantially avoiding the entrance of air into the overlying gaseous medium at said region and which might otherwise take place incident to said removal and discharge, and withdrawing clarified liquid derived from a portion of the ever-changing body that is at elevation lower than that of the inwardly passed liquid solids mixture as delivered into the body and transferring it for discharge to a locality outside of said body and away from the influence of said overlying gaseous medium and during such transferring of the clarified liquid substantially avoiding entrance of air into said body and thus into the region overlain by said gas incident to said transferring and discharge of said clarified liquid.

THEODORE B. COUNSELMAN.